United States Patent
Chiba et al.

(10) Patent No.: US 9,809,267 B2
(45) Date of Patent: Nov. 7, 2017

(54) VEHICLE SEAT

(71) Applicant: TS TECH CO., LTD., Asaka-shi, Saitama (JP)

(72) Inventors: Tomohisa Chiba, Tochigi (JP); Yoshinori Ueyama, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 15/035,653

(22) PCT Filed: Sep. 5, 2014

(86) PCT No.: PCT/JP2014/073552
§ 371 (c)(1),
(2) Date: May 10, 2016

(87) PCT Pub. No.: WO2015/068459
PCT Pub. Date: May 14, 2015

(65) Prior Publication Data
US 2016/0280298 A1 Sep. 29, 2016

(30) Foreign Application Priority Data
Nov. 11, 2013 (JP) .................................. 2013-233233

(51) Int. Cl.
*B62J 1/12* (2006.01)
*B60K 15/04* (2006.01)

(52) U.S. Cl.
CPC ............. *B62J 1/12* (2013.01); *B60K 15/0406* (2013.01)

(58) Field of Classification Search
CPC ..... B62J 1/00; B62J 1/002; B62J 1/007; B62J 1/08; B62J 1/12
See application file for complete search history.

(56) References Cited

U.S. PATENT DOCUMENTS

| 5,044,646 | A | * | 9/1991 | Iiga | ............................. B62J 1/12 180/219 |
| 5,094,315 | A | * | 3/1992 | Taki | ....................... B62K 19/46 180/219 |

(Continued)

FOREIGN PATENT DOCUMENTS

| JP | 61-016056 U | 1/1986 |
| JP | 03-026687 U | 3/1991 |

(Continued)

*Primary Examiner* — Philip F Gabler
(74) *Attorney, Agent, or Firm* — Drinker Biddle & Reath LLP

(57) ABSTRACT

A vehicle seat that provides rigidity of the seat while enabling weight reduction of the seat is provided. The vehicle seat has upper ribs projecting from a top surface and lower ribs projecting from a bottom surface in a seating region of a bottom plate. Also provided in the seating region are a center protrusion portion formed at a center portion and an annular protrusion portion formed outside the center protrusion portion to have a space therebetween. The upper ribs are formed at parts different from parts at which the center protrusion portion and the annular protrusion portion are formed, while the lower ribs are formed at the parts at which the center protrusion portion and the annular protrusion portion are formed. The upper ribs and the lower ribs are arranged alternately, while extending radially from the center protrusion portion toward the annular protrusion portion to form a honeycomb shape.

19 Claims, 9 Drawing Sheets

(56) References Cited

U.S. PATENT DOCUMENTS

| | | | | |
|---|---|---|---|---|
| 5,203,607 | A | 4/1993 | Landi | |
| 7,621,362 | B2 * | 11/2009 | Ogawa | B62J 1/08 |
| | | | | 180/219 |
| 8,057,717 | B2 * | 11/2011 | Thompson | B29C 44/086 |
| | | | | 264/255 |
| 8,418,793 | B2 * | 4/2013 | Yano | B62J 1/12 |
| | | | | 180/219 |
| 9,643,673 | B2 * | 5/2017 | Chiba | B62J 1/12 |
| 2010/0072804 | A1 * | 3/2010 | Stauske | B60N 2/5621 |
| | | | | 297/452.38 |
| 2011/0210597 | A1 * | 9/2011 | Takeuchi | B29C 44/1238 |
| | | | | 297/452.55 |

FOREIGN PATENT DOCUMENTS

| | | |
|---|---|---|
| JP | 2004-237936 A | 8/2004 |
| JP | 2006-281921 A | 10/2006 |
| JP | 2008-056009 A | 3/2008 |
| JP | 2009-154848 A | 7/2009 |

* cited by examiner

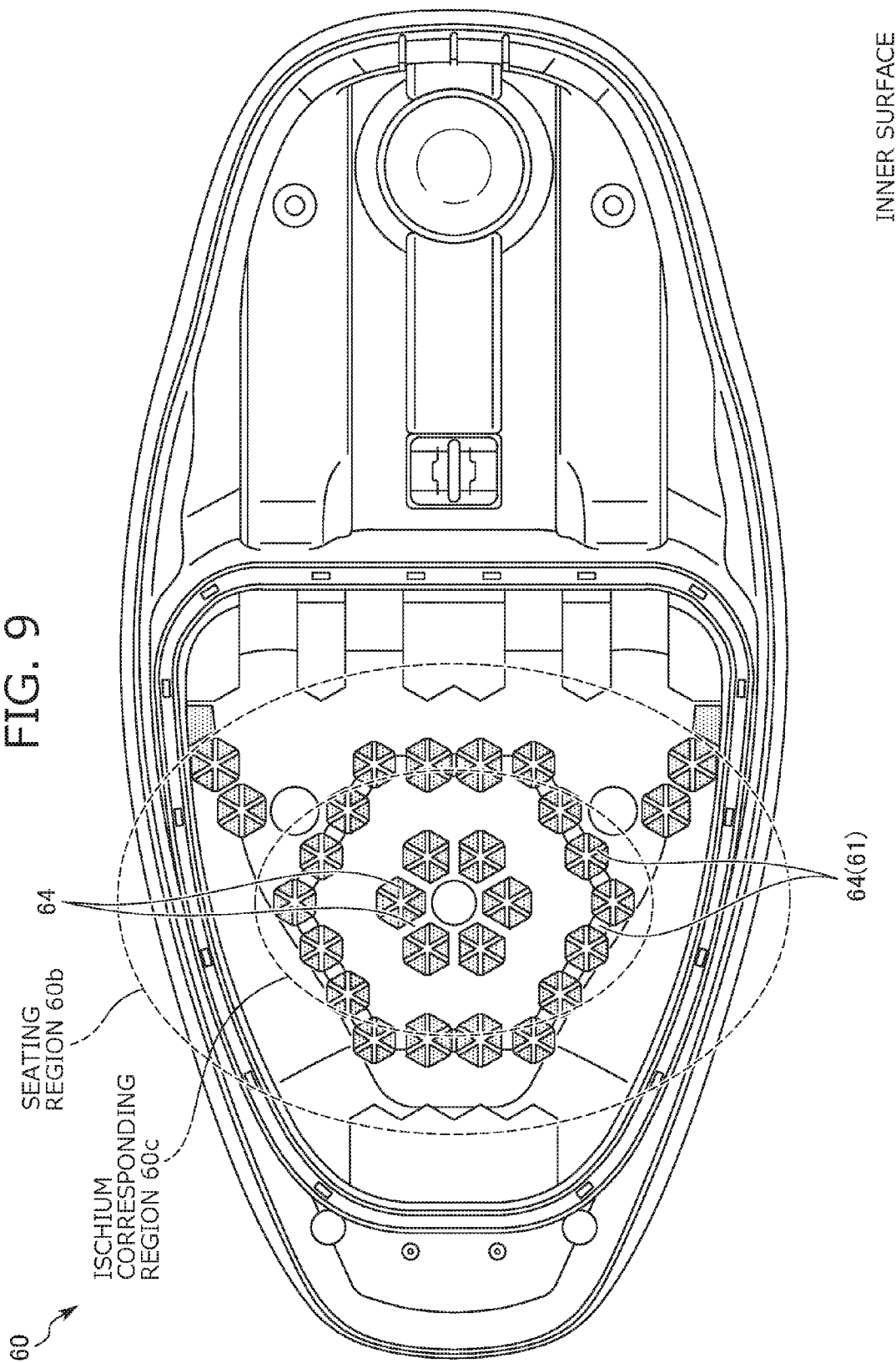

VEHICLE SEAT

CROSS-REFERENCE TO RELATED APPLICATIONS

This application is a National Stage Entry application of PCT Application No. PCT/JP2014/073552, filed Sep. 5, 2014, which claims the priority benefit of Japanese Patent Application No. 2013-233233, filed on Nov. 11, 2013, the contents being incorporated herein by reference.

BACKGROUND

The present disclosure relates to a vehicle seat, and particularly to a saddled vehicle seat that is used for motorcycles, snowmobiles, personal watercrafts, and the like.

Hitherto, in a saddled vehicle seat including a seating portion that includes a bottom plate, various techniques for enhancing the rigidity of the bottom plate to support a load applied by a seat occupant, a repeated load due to vibration during travel, and the like have been proposed. For example, it is known to arrange reinforcement ribs in a lattice shape on a surface of the bottom plate, thereby securing the rigidity of the entire seat.

In a vehicle seat disclosed in Japanese Patent Publication JP 2009-154848 A, protrusion portions that project upward or downward and extend in such a manner as to form acute angles with respect to a seat front to back direction and a seat width direction are formed as reinforcement ribs on a surface of a bottom board corresponding to the bottom plate. This configuration allows the rigidity of the entire seat to be provided while allowing a material used to be less in comparison with conventional cases in which the reinforcement ribs are arranged in a lattice shape on the bottom plate, which can secure weight reduction of the seat.

Note that, in a saddled vehicle seat that is used for motorcycles and the like, providing rigidity of a seat and also reducing the weight to improve fuel efficiency have been strongly demanded. In the vehicle seat disclosed in Japanese Patent Publication JP 2009-154848 A, the arrangement and configuration of the protrusion portions corresponding to the reinforcement ribs are designed for weight reduction of the seat, while further weight reduction has been widely desired.

Moreover, since a seat of motorcycles or the like requires the rigidity of the seat particularly in a seating region that supports a seat occupant, an outer edge region, a peripheral region of a fuel supply opening, and the like, a seat in which the rigidity of these regions of the entire seat is provided while weight reduction of the seat is improved has been desired.

SUMMARY

The present disclosure has been made in view of the above problem and an object of an embodiment is to provide a vehicle seat that provides rigidity of the seat and weight reduction of the seat. Moreover, another object of an embodiment is to provide a vehicle seat that provides rigidity in a seating region, an outer edge region of the seat, and a peripheral region of a fuel supply opening of the seat of the entire seat while enabling weight reduction of the seat.

The problem is solved by a vehicle seat according to an embodiment, the vehicle seat including a seating portion having a bottom plate, in which at least a part of a surface of the bottom plate has reinforcement ribs that project from the surface, and at least some of the reinforcement ribs form a honeycomb shape.

As described above, at least a part of a surface of the bottom plate has reinforcement ribs forming a honeycomb shape, whereby the rigidity of the seat can be secured while weight reduction of the seat can be achieved. Specifically, as a honeycomb structure, the reinforcement ribs are formed on the surface of the bottom plate to partition a substantially regular hexagonal space without clearance to be excellent in load dispersion and have a high strength, and to be strong against twists and torsion and have a high rigidity, while the volume of the reinforcement ribs is reduced when a three-dimensional space is filled by a pattern having the same volume, whereby weight reduction can be achieved.

In an embodiment, at least some of the reinforcement ribs are arranged in a seating region that supports a seat occupant on at least one of a top surface and a bottom surface of the bottom plate. Moreover, at least some of the reinforcement ribs are arranged in an ischium corresponding region that supports right and left ischium parts of a seat occupant in the seating region. With the configuration as described above, the honeycomb-shaped reinforcement ribs are formed in the seating region, and particularly in the ischium corresponding region of the entire seat, whereby the rigidity can be secured.

In an embodiment, the reinforcement ribs include upper ribs arranged on a top surface of the bottom plate and lower ribs arranged on a bottom surface of the bottom plate, a reinforcement protrusion portion that projects from a bottom surface side of the bottom plate toward a top surface side of the bottom plate is provided in the seating region, the whole or a part of the upper ribs is formed at a part different from a part at which the reinforcement protrusion portion is formed, the whole or a part of the lower ribs is formed at the part at which the reinforcement protrusion portion is formed, and the whole or the part of the upper ribs and the whole or the part of the lower ribs form the honeycomb shape. As described above, the upper ribs and the lower ribs are each arranged on the surface of the bottom plate so that the rigidity of the entire bottom plate is improved, for example, in comparison with a case in which the reinforcement ribs are arranged only on the top surface of the bottom plate. Moreover, the whole or a part of the upper ribs is formed at a part different from a part at which the protrusion portion is formed on a top surface of the seating region, and the whole or a part of the lower ribs is formed at the part at which the protrusion portion is formed on a bottom surface of the seating region so that the reinforcement ribs do not protrude excessively in a height direction of the bottom plate, and the bottom plate can be reduced in size. Moreover, the upper ribs and the lower ribs form the honeycomb shape so that the rigidity particularly in the seating region of the entire seat can be secured while weight reduction of the entire seat can be obtained.

In an embodiment, the whole or a part of at least one of the upper ribs and the lower ribs extends radially from a center portion of the seating region toward an outer edge side. With the configuration as described above, the rigidity is improved over the entire seating region of the bottom plate.

In an embodiment, the whole or a part of at least one of the upper ribs and the lower ribs are arranged to partition at least a part of each of substantially hexagonal shapes forming the honeycomb shape into two or more substantially polygonal shapes in the seating region. With the configuration as described above, the rigidity is further improved in the seating region of the bottom plate.

In an embodiment, the reinforcement protrusion portion includes a center protrusion portion formed at a center portion of the seating region and an annular protrusion portion arranged outside the center protrusion portion to have a space therebetween and connected to the center protrusion portion through the upper ribs, and the upper ribs and the lower ribs are arranged alternately, while extending radially from the center protrusion portion toward a side of the annular protrusion portion. With the configuration as described above, protrusion and depression shapes are formed alternately from the center protrusion portion over the annular protrusion portion in the seating region, while the upper ribs and the lower ribs are formed alternately so that the rigidity is improved in the seating region of the bottom plate. Moreover, the center protrusion portion and the annular protrusion portion are connected to each other through the upper ribs so that the rigidity is further improved.

In an embodiment, top surfaces of the center protrusion portion, the upper ribs, and the annular protrusion portion form a plane in the seating region. With the configuration as described above, a seat occupant is supported by a plane part of the bottom plate so that seating feeling is improved in comparison with a structure provided with conventional reinforcement ribs.

In an embodiment, the center protrusion portion and the annular protrusion portion have a substantially annular cross section, and the reinforcement protrusion portion has a plurality of substantially annular cross sections to have a predetermined space therebetween from the center portion of the seating region toward an outer edge side. With the configuration as described above, annular protrusion and depression shapes are formed alternately from a center portion toward an outer edge in the seating region of the bottom plate so that the rigidity is further improved.

In an embodiment, a center through hole extending from a top surface side to a bottom surface side is formed at a center portion of the center protrusion portion, an air release hole that is provided at a part different from the center through hole and extends from the top surface side to the bottom surface side is formed on the top and bottom surfaces of the bottom plate, and the upper ribs and the lower ribs extend radially from the center through hole to the air release hole. With the configuration as described above, relatively less rigid parts of the surface of the bottom plate at which the through holes are formed are allowed to have the honeycomb-shaped reinforcement ribs so as to be reinforced.

In an embodiment, at least some of the reinforcement ribs that are arranged in the ischium corresponding region have a thickness greater than that of at least some of the reinforcement ribs that are arranged in a region other than the ischium corresponding region. With the configuration as described above, in the ischium corresponding region in which a load applied by a seat occupant is relatively large in the bottom plate, the rigidity of the seat can be secured.

In an embodiment, the reinforcement ribs include side ribs linearly extending from a side of the seating region toward an outer edge side on an outer surface of the bottom plate. With the configuration as described above, particularly in an outer edge region of the entire seat, the rigidity can be secured. Note that the outer edge region of the seat has improved rigidity, whereby deformation of the seat can be resisted even if a third person tries to forcibly open the seat from a vehicle body.

In an embodiment, a part of the reinforcement ribs is arranged in a fuel supply opening corresponding region that is a region corresponding to a fuel supply opening of vehicles on a top surface of the bottom plate, and forms the honeycomb shape in the fuel supply opening corresponding region. With the configuration as described above, particularly in a peripheral region of the fuel supply opening of the seat of the entire seat, the rigidity can be secured. Note that the peripheral region of the fuel supply opening of the seat has improved rigidity, whereby deformation of the seat can be resisted even if a third person tries to forcibly open the seat in order to steal fuel from a vehicle body.

According to an embodiment, at least a part of a surface of the bottom plate has reinforcement ribs forming a honeycomb shape, whereby the rigidity of the seat can be secured while weight reduction of the seat can be achieved. Moreover, according to an embodiment, the honeycomb-shaped reinforcement ribs are formed in the seating region, and particularly in the ischium corresponding region of the entire seat, whereby the rigidity can be secured.

Moreover, according to an embodiment, the upper ribs and the lower ribs are each arranged on the surface of the bottom plate so that the rigidity of the entire bottom plate is improved, for example, in comparison with a case in which the reinforcement ribs are arranged only on the top surface of the bottom plate. Moreover, the reinforcement ribs do not protrude excessively in a height direction of the bottom plate, and the bottom plate can be miniaturized. Moreover, the honeycomb shape is formed so that the rigidity particularly in the seating region of the entire seat can be secured while weight reduction of the entire seat can be achieved.

Moreover, according to an embodiment, the rigidity is improved over the entire seating region of the bottom plate. Moreover, according to an embodiment, protrusion and depression shapes are formed alternately from the center protrusion portion over the annular protrusion portion in the seating region, while the upper ribs and the lower ribs are formed alternately so that the rigidity is improved in the seating region of the bottom plate. Moreover, the center protrusion portion and the annular protrusion portion are connected to each other through the upper ribs so that the rigidity is further improved.

Moreover, according to an embodiment, a seat occupant is supported by a plane part of the bottom plate so that seating feeling is improved in comparison with a structure provided with conventional reinforcement ribs. Moreover, according to an embodiment, annular protrusion and depression shapes are formed alternately from a center portion toward an outer edge in the seating region of the bottom plate so that the rigidity is further improved. Moreover, according to an embodiment, relatively less rigid parts of the surface of the bottom plate at which the through holes are formed are allowed to have the honeycomb-shaped reinforcement ribs so as to be reinforced.

Moreover, according to an embodiment, in the ischium corresponding region of the seat, the rigidity of the seat can be secured. Moreover, according to an embodiment, in an outer edge region of the seat, the rigidity can be secured. Moreover, according to an embodiment, in a peripheral region of the fuel supply opening of the seat, the rigidity can be secured.

BRIEF DESCRIPTION OF DRAWINGS

FIG. 9 is a bottom view illustrating the fourth example of the bottom plate.

DETAILED DESCRIPTION

Hereinafter, various embodiments of the present disclosure are described with reference to FIGS. 1-9. The present embodiment relates to an invention of a seat for a motorcycle that has a bottom plate, the seat including upper ribs projecting from a top surface and lower ribs projecting from a bottom surface in a seating region of the bottom plate, in which the upper ribs and the lower ribs are arranged alternately, while extending radially from a center portion of the seating region to form a honeycomb shape.

Figure 1:
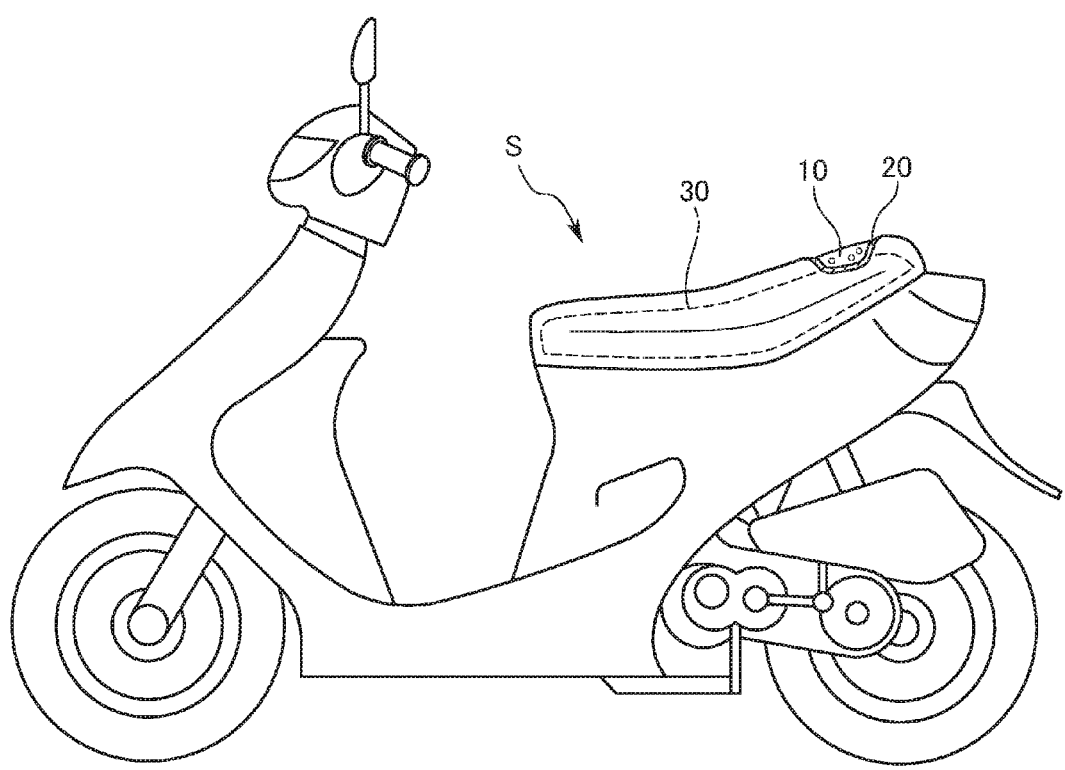
FIG. 1 is a right side view illustrating a vehicle seat according to the present embodiment.

As illustrated in FIG. 1, a seat S according to the present embodiment is a seating portion of the motorcycle, and includes a bottom plate 30 that is a base plate, a cushion material 10 that is placed on the bottom plate 30, and a skin material 20 that covers the bottom plate 30 and the cushion material 10. In the seat S, edge treatment, in which a skin edge of the skin material 20 is attached to an inner surface of the bottom plate 30 by a staple or the like, is performed.

The cushion material 10 is made of an elastic member using a urethane foam or the like. The skin material 20 is made of a cover member using a polyvinyl chloride, leather, or the like, and is preferable as a skin material for motorcycles that are exposed directly to wind or rain. The skin material 20 is formed by laminating a surface of a fiber base member, such as woven fabrics, knitted fabrics, and non-woven fabrics, with a soft polyvinyl chloride layer.

Figure 2:
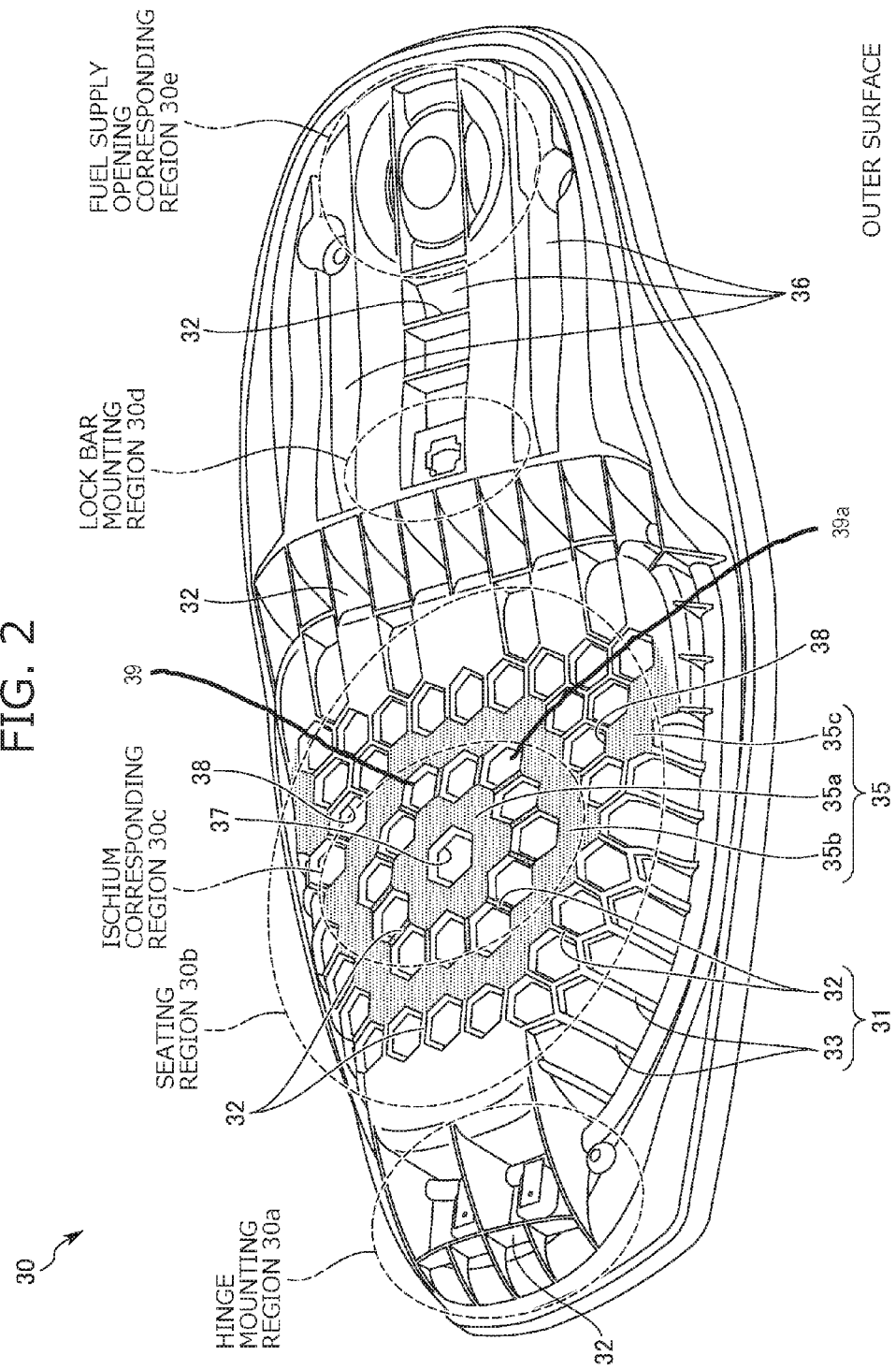
FIG. 2 is a perspective view of a bottom plate of the seat as seen from a top surface side.

The bottom plate 30 is made of a plate-shaped resin molded article having polypropylene as a raw material, and is, as illustrated in FIG. 1, a base plate of the seat S that is mounted on a motorcycle body. As illustrated in FIG. 2, the bottom plate 30 is elongated in a seat front to back direction and is formed into a generally stepped shape to fit on a shape of the motorcycle body.

Figure 3:
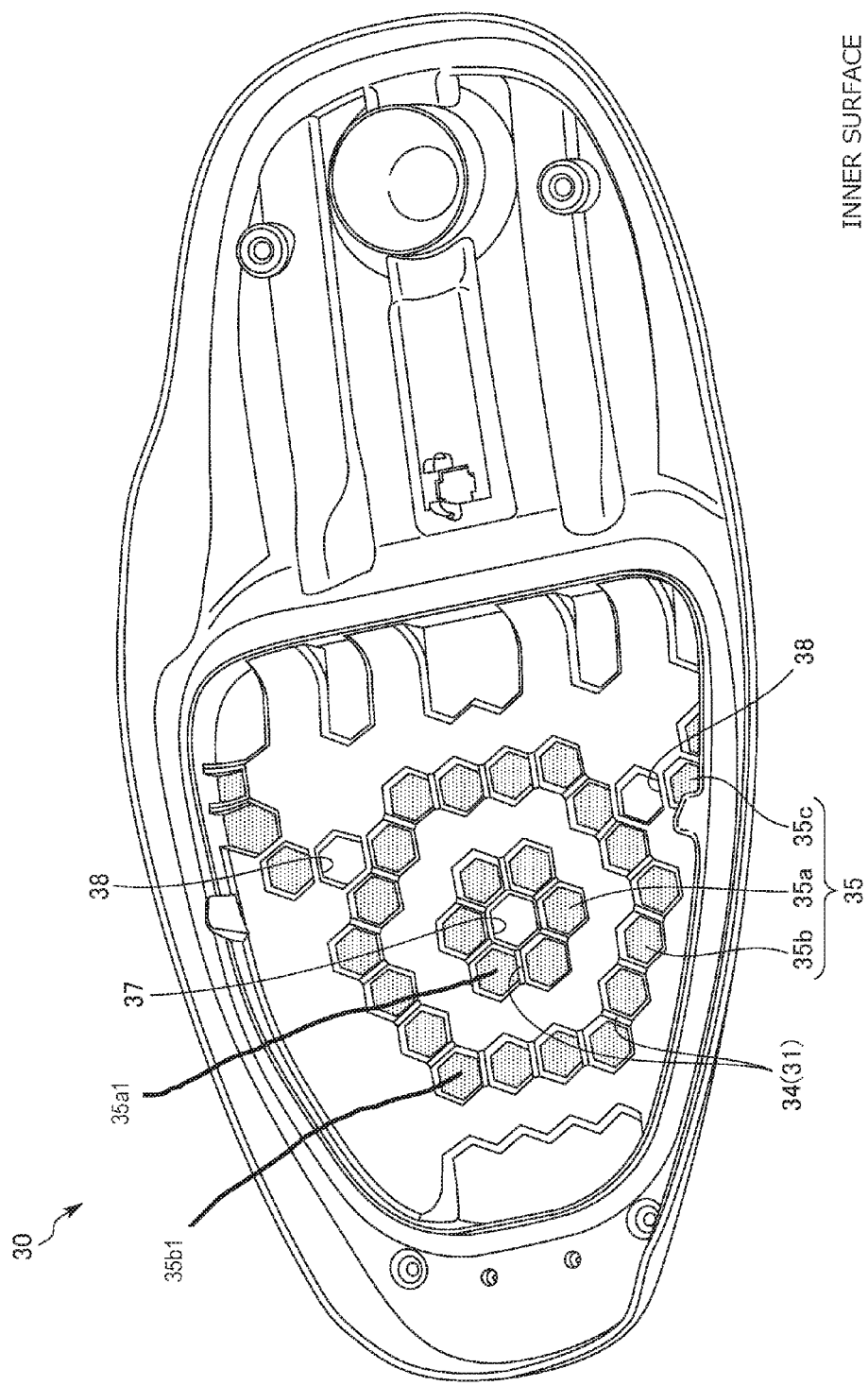
FIG. 3 is a perspective view of the bottom plate of FIG. 2 as seen from a bottom surface side.

The bottom plate 30 includes a hinge mounting region 30a that is provided at a seat front portion and is a region pivotably mounted on the motorcycle body, a seating region 30b that is provided at a substantially center portion in the seat front to back direction and is a region supporting a seat occupant, a fuel supply opening corresponding region 30e that is provided at a seat back part and is a region corresponding to a fuel supply opening of the motorcycle, a lock bar mounting region 30d that is provided between the seating region 30b and the fuel supply opening corresponding region 30e and is a region lockably mounted on the motorcycle body. Moreover, in the seating region 30b, an ischium corresponding region 30c that is a region supporting right and left ischium parts of a seat occupant is provided. As illustrated in FIGS. 2 and 3, on a surface of the bottom plate 30, reinforcement ribs 31 that are formed to project from the surface are arranged substantially over the entirety.

The reinforcement ribs 31 are made of plate-shaped members integrally formed with the bottom plate 30, and form a predetermined shape by combining the plurality of plate-shaped members. Note that a base portion of the reinforcement ribs 31 has a radius of curvature R. Accordingly, the rigidity of the bottom plate 30 is improved and molding properties are favorably maintained. As illustrated in FIG. 2, the reinforcement ribs 31 are mainly made of upper ribs 32 that project upward from a top surface of the bottom plate 30, side ribs 33 that project sideward from a side surface of the bottom plate 30, and lower ribs 34 that project downward from a bottom surface of the bottom plate 30.

As illustrated in FIG. 2, the upper ribs 32 are arranged on the top surface of the bottom plate 30 to change a shape thereof in accordance with a predetermined region. Specifically, a part of the upper ribs 32 extends linearly to form a substantially lattice shape in the high mounting region 30a. Further, a part of the upper ribs 32 extends radially from a center portion of the seating region 30b to form the substantially honeycomb shape in the seating region 30b. Furthermore, a part of the upper ribs 32 extends linearly from the seating region 30b toward the lock bar mounting region 30d and is plurally arranged to have a predetermined space therebetween in a seat width direction.

As illustrated in FIG. 2, the side ribs 33 are plurally arranged on an outside surface of the bottom plate 30 to have a predetermined space therebetween in the seat front to back direction, and each extend linearly from the seating region 30b toward an outer edge. In detail, the side ribs 33 each extend continuously from each of outermost vertexes of the upper ribs 32 having a honeycomb shape in the seating region 30b toward the outer edge of the bottom plate 30.

As illustrated in FIG. 3, the lower ribs 34 extend radially from the center portion of the seating region 30b to form the substantially honeycomb shape in the seating region 30b on the bottom surface of the bottom plate 30. In the configuration as described above, a part of the upper ribs 32 and the whole of the lower ribs 34 are arranged alternately, while continuously extending radially from the center portion of the seating region 30b to form the honeycomb shape over the entire seating region 30b.

As illustrated in FIG. 2 or FIG. 3, on the surface of the bottom plate 30, a reinforcement protrusion portion 35, that projects from a bottom surface side to a top surface side in the seating region 30b, and reinforcement depression portions 36, that extend from the fuel supply opening corresponding region 30e to the lock bar mounting region 30d and are depressed from the top surface side toward the bottom surface side, are provided.

As illustrated in FIG. 2, the reinforcement protrusion portion 35 includes a center protrusion portion 35a formed at the center portion of the seating region 30b and an annular protrusion portion 35b arranged outside the center protrusion portion 35a to have a predetermined space therebetween and connected to the center protrusion portion 35a through the upper ribs 32. The center protrusion portion 35a is made of a protrusion portion having a substantially hexagonal cross section, and in detail, is made of a protrusion portion having a cross-sectional shape in which seven substantially regular hexagons are arranged without clearance. The annular protrusion portion 35b is made of a protrusion portion having a substantially annular cross section, and in detail, is made of a protrusion portion having a cross-sectional shape in which 18 substantially regular hexagons are annularly arranged. Each of outside vertexes of the center protrusion portion 35a and each of inside vertexes of the annular protrusion portion 35b are connected to each other through the upper ribs 32.

In the configuration as described above, as illustrated in FIG. 2, the upper ribs 32 arranged in the seating region 30b are arranged at parts different from a part at which the reinforcement protrusion portion 35 is formed. Further, in the seating region 30b, top surfaces of the upper ribs 32, a top surface of the center protrusion portion 35a, and a top surface of the annular protrusion portion 35b are formed to be flush with each other. As a result, a seat occupant is supported by a plane part of the bottom plate 30 so that seating feeling is improved in comparison with a structure provided with conventional reinforcement ribs.

As illustrated in FIG. 3, the lower ribs 34 arranged in the seating region 30b are arranged at the part at which the reinforcement protrusion portion 35 is formed. Further, in the seating region 30b, bottom surfaces of the lower ribs 34 and the bottom surface of the bottom plate 30 are formed to be flush with each other. As a result, the lower ribs 34 do not protrude excessively in a height direction of the bottom plate 30 so that a storage portion of the motorcycle body that is disposed below the seat S can secure a space in which a large size article to be stored, such as a helmet, is stored.

Note that, at both seat right and left end portions of the seating region 30b, right and left relief protrusion portions 35c that project from the bottom surface side toward the top surface side and are provided for relief during molding are formed. Consequently, generation of a sink during molding can be suppressed, which allows the bottom plate 30 to be reduced in weight.

The reinforcement depression portions 36 are made of a depression portion having a substantially tetragonal cross section elongated in the seat front to back direction. Three reinforcement depression portions 36 are formed to have a predetermined space therebetween in the seat width direction, and extend from the fuel supply opening corresponding region 30e to the lock bar mounting region 30d. In detail, the reinforcement depression portion 36 at a center position in the seat width direction is arranged to overlap the lock bar mounting region 30d at a front part thereof while arranged to overlap the fuel supply opening corresponding region 30e at a back part thereof. On a top surface of the reinforcement depression portions 36, a part of the upper ribs 32 that extends in the seat width direction is plurally arranged to have a predetermined space therebetween in the seat width direction.

As illustrated in FIG. 2, on the surface of the bottom plate 30, a substantially regular hexagonal center through hole 37 that extends from the top surface side to the bottom surface side at the center portion of the seating region 30b and substantially circular air release through holes 38 that extends from the top surface side to the bottom surface side at both the seat right and left end portions of the seating region 30b are provided. The center through hole 37 serves as a relief hole for suppressing interference when a helmet or the like is stored in the storage portion provided in the motorcycle body. The air release holes 38 serve as holes for maintaining the air pressure in a tank to be constant during fuel supply.

In the configuration as described above, the upper ribs 32 and the lower ribs 34 that are arranged in the seating region 30b extend radially from the center through hole 37 to reach the air release holes 38 to form the honeycomb shape. Accordingly, relatively less rigid parts of the surface of the bottom plate 30 at which the through holes are formed are allowed to have the honeycomb-shaped reinforcement ribs 31.

Second Embodiment of the Bottom Plate

Next, a second example embodiment of the bottom plate is described with reference to FIGS. 4 and 5. Note that, in the following description, the description of the content overlapping the bottom plate 30 as described above is omitted. The same applies hereinafter for additional described embodiments. In a bottom plate 40 according to the second example, the shape and arrangement of reinforcement ribs 41 are different.

Figure 4:
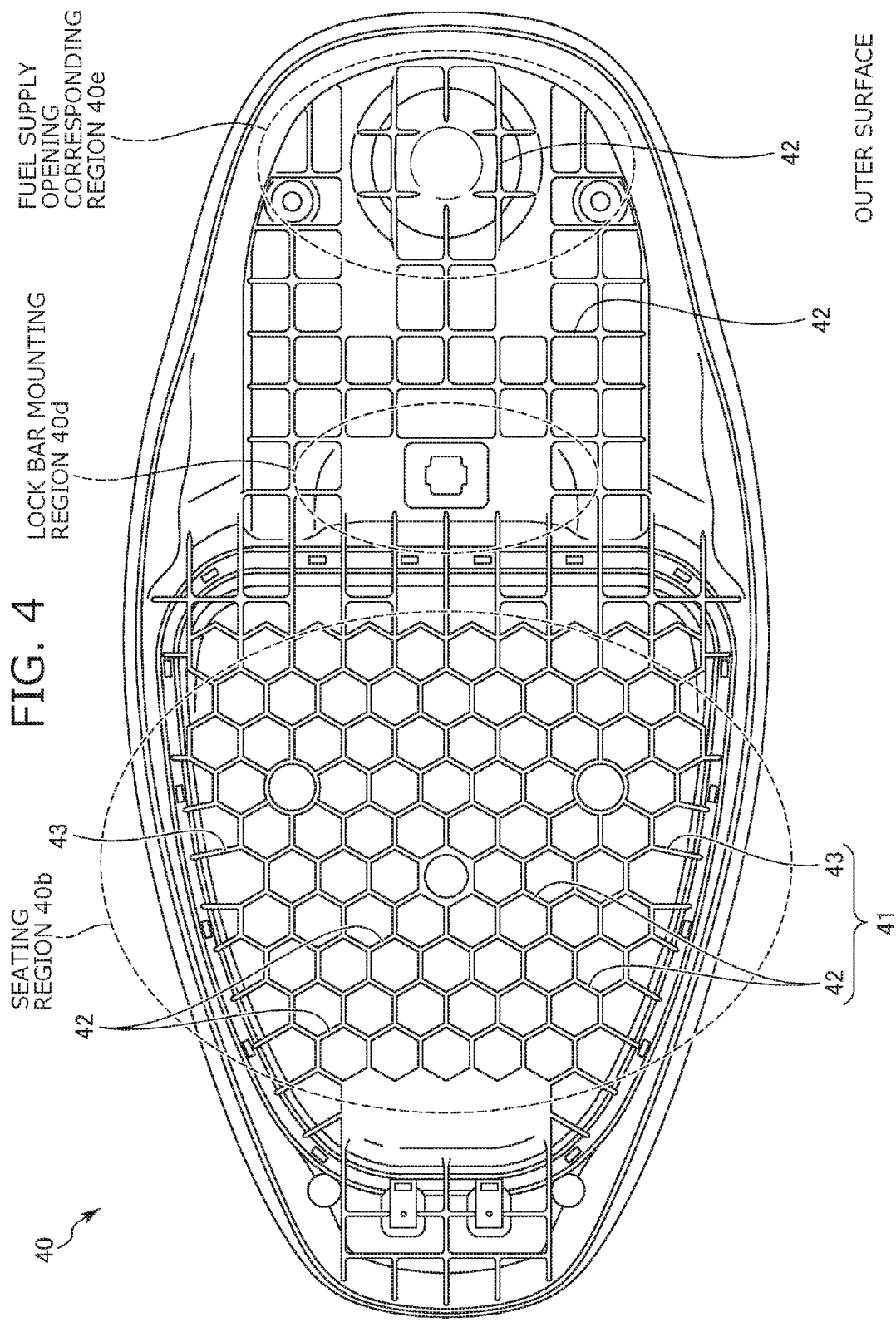
FIG. 4 is a top view illustrating a second example of the bottom plate.
Figure 5:
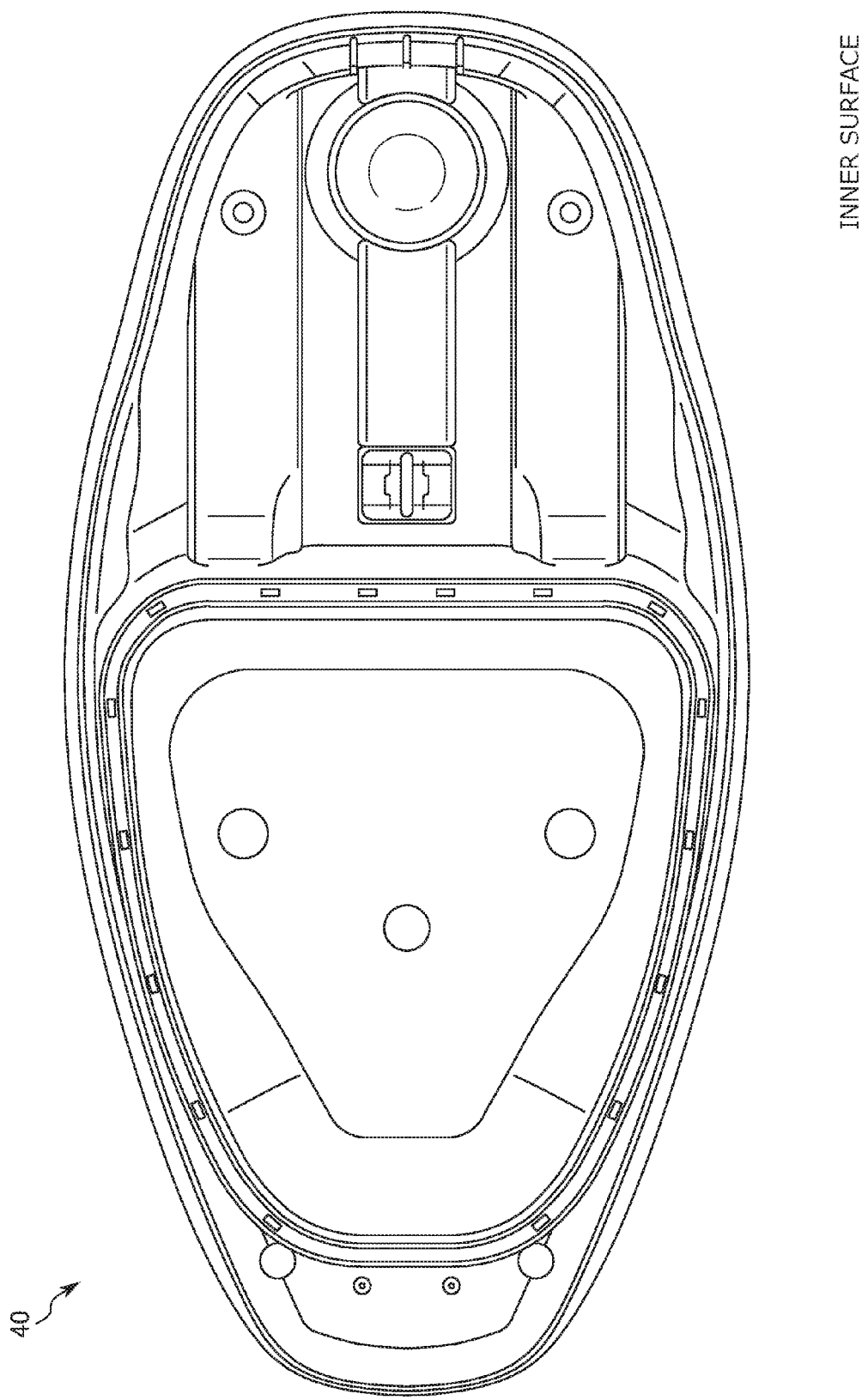
FIG. 5 is a bottom view illustrating the second example of the bottom plate.

As illustrated in FIGS. 4 and 5, the reinforcement ribs 41 are mainly made of upper ribs 42 and side ribs 43, while a bottom surface of the bottom plate 40 is not provided with the reinforcement ribs 41. A part of the upper ribs 42 continuously extends radially from a center portion of a seating region 40b to form a honeycomb shape over the entire seating region 40b. A part of the upper ribs 42 extends linearly from the seating region 40b beyond a lock bar mounting region 40d to a fuel supply opening corresponding region 40e to form a lattice shape over the entirety.

With the configuration as described above, the reinforcement ribs 41 are formed over an entire top surface of the bottom plate 40, thereby securing the rigidity, while the reinforcement ribs 41 are not formed on the bottom surface of the bottom plate 40, thereby providing for weight reduction. Further, the reinforcement ribs 41 are not formed on the bottom surface of the bottom plate 40, whereby a storage portion of the motorcycle body that is disposed below the seat S can sufficiently secure a space in which a large size article to be stored, such as a helmet, is stored. Further, the relatively simple shape in which protrusion and depression portions are not formed in a vertical direction of the bottom plate 40 allows resin molding to be easily performed.

Third Embodiment of the Bottom Plate

Next, a third example embodiment of the bottom plate is described with reference to FIGS. 6 and 7. In a bottom plate 50 according to the third example embodiment, the shape and arrangement of reinforcement ribs 51 are different.

Figure 6:
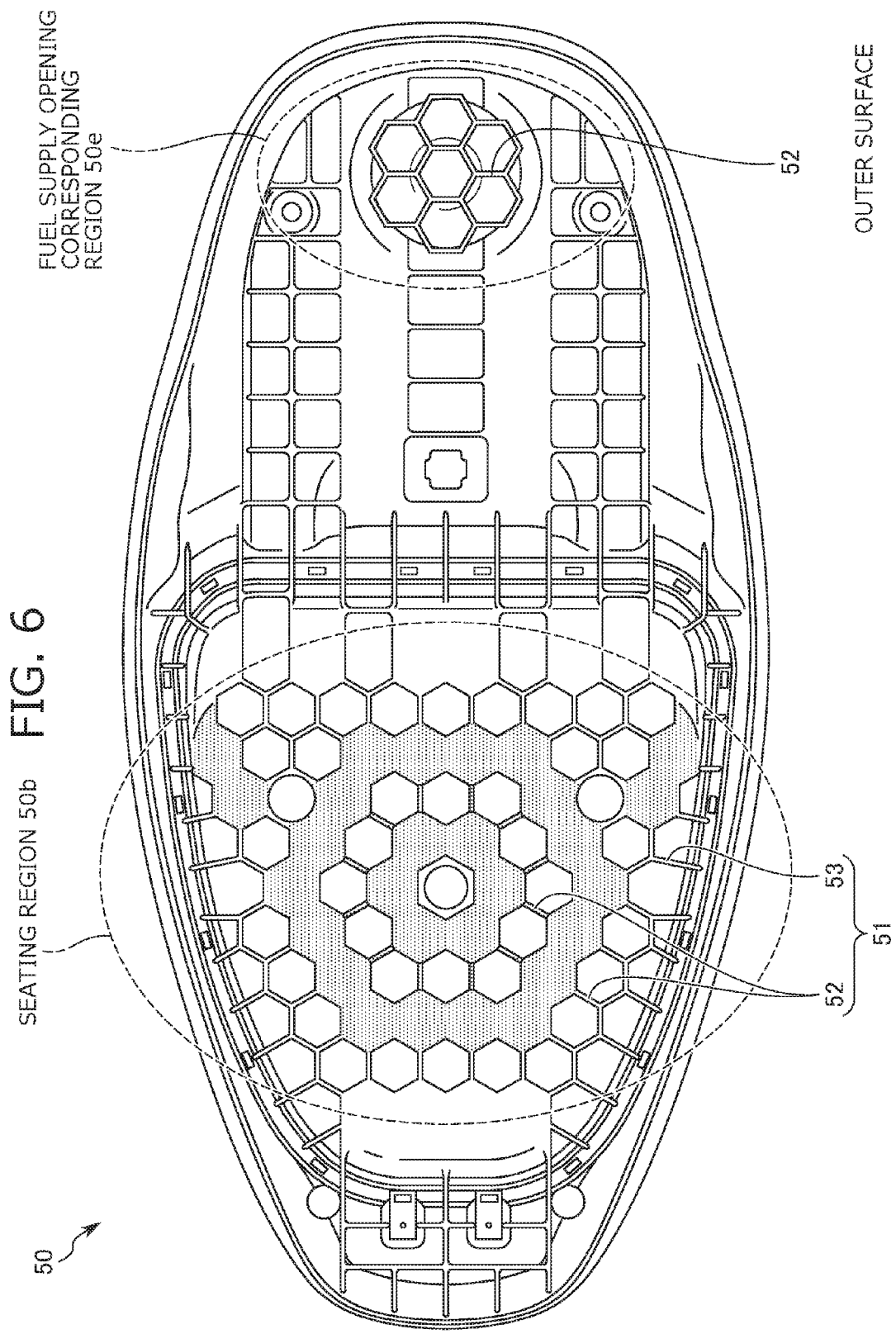
FIG. 6 is a top view illustrating a third example of the bottom plate.
Figure 7:
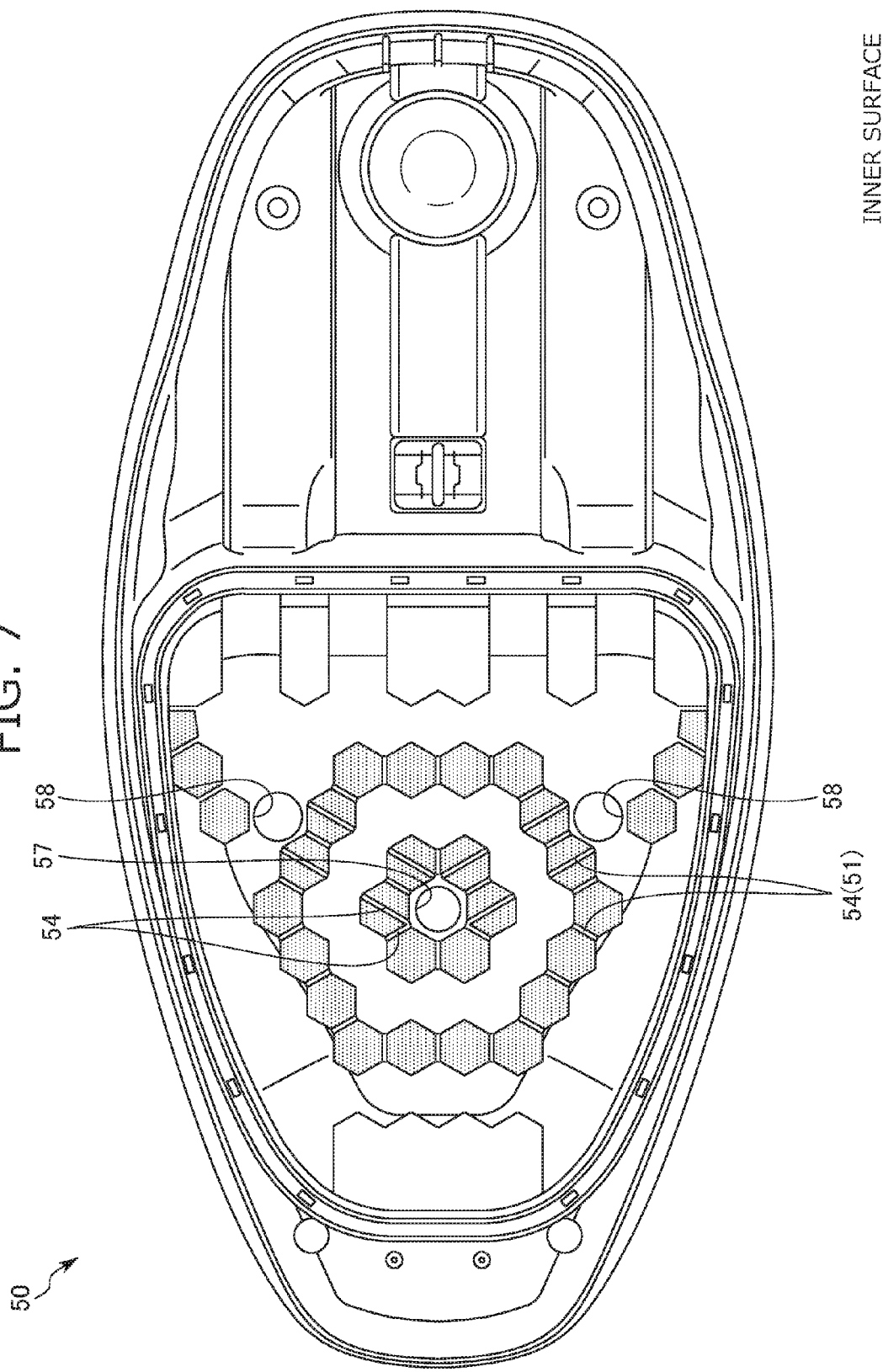
FIG. 7 is a bottom view illustrating the third example of the bottom plate.

As illustrated in FIGS. 6 and 7, the reinforcement ribs 51 are mainly made of upper ribs 52, side ribs 53, and lower ribs 54. The upper ribs 52 are arranged to form a honeycomb shape in a fuel supply opening corresponding region 50e. The lower ribs 54 form a honeycomb shape in a seating region 50b, while arranged to partition each of regular hexagonal shapes (substantially hexagonal shapes) forming the honeycomb shape further into two trapezoidal shapes in a region between a center through hole 57 and right and left air release holes 58. Note that the lower ribs 54 may be arranged to partition each of the regular hexagonal shapes into two trapezoidal shapes while partitioning the same into at least two polygonal shapes.

The configuration as described above allows the fuel supply opening corresponding region 50e that relatively requires the rigidity in the bottom plate 50 to have the honeycomb-shaped reinforcement ribs 51, whereby the rigidity can be secured. Further, the region between the center through hole 57 and the right and left air release holes 58 that relatively requires the rigidity in the bottom plate 50 is provided with the honeycomb shape having trapezoidal partitions, whereby the rigidity can be further improved.

Fourth Embodiment of the Bottom Plate

Next, a fourth example embodiment of the bottom plate is described with reference to FIGS. 8 and 9. In a bottom plate 60 according to the fourth example embodiment, the shape and arrangement of reinforcement ribs 61 are different.

Figure 8:
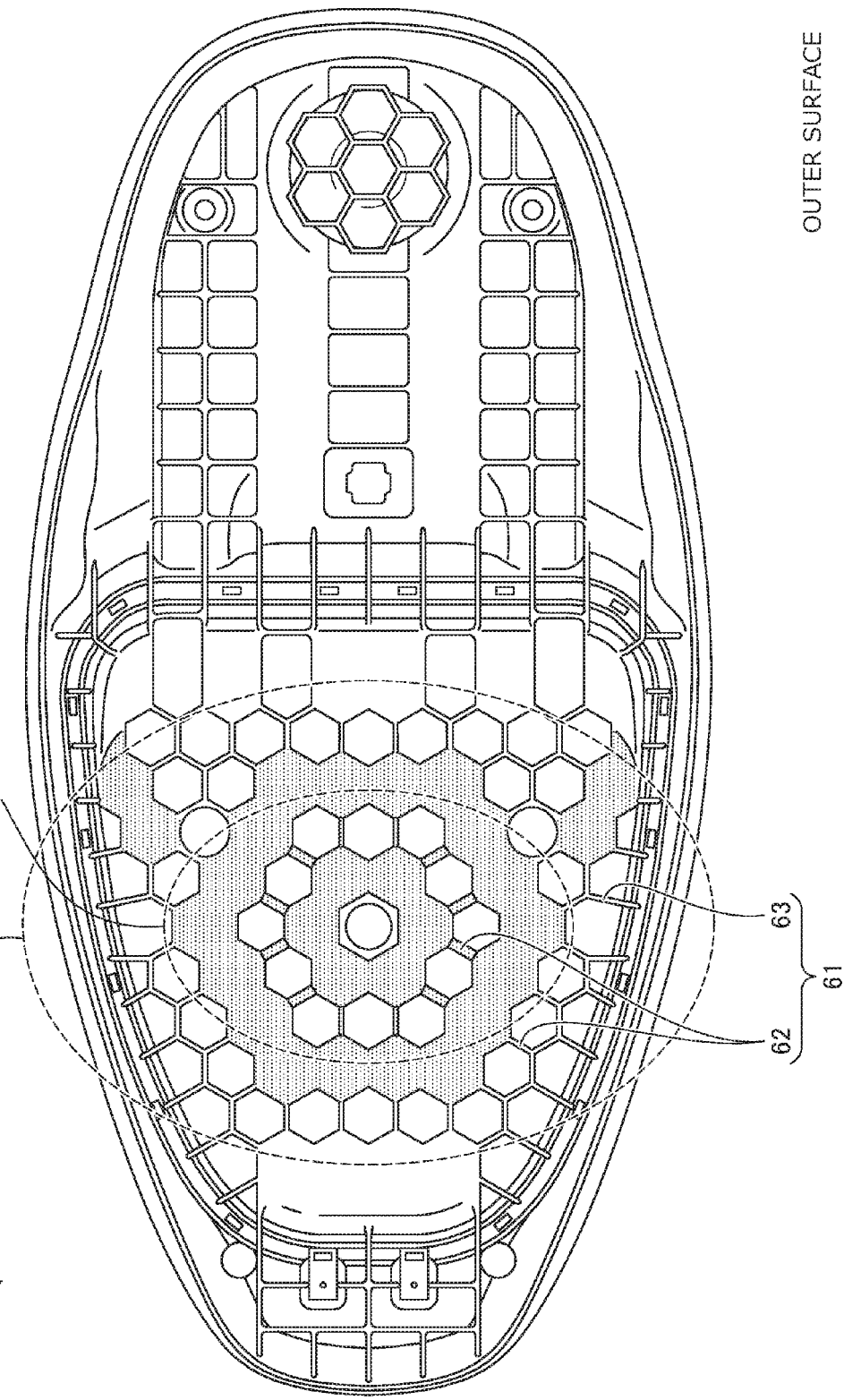
FIG. 8 is a top view illustrating a fourth example of the bottom plate.

As illustrated in FIGS. 8 and 9, the reinforcement ribs 61 are mainly made of upper ribs 62, side ribs 63, and lower ribs 64. The upper ribs 62 are formed such that the thickness of the upper ribs 62 that are arranged in an ischium corresponding region 60c is greater than the thickness of the upper ribs 62 that are arranged in a region other than the ischium corresponding region 60c. The lower ribs 64 form a honeycomb shape in a seating region 60b, while arranged to partition each of regular hexagonal shapes forming the honeycomb shape further into six regular triangle shapes. The lower ribs 64 are formed such that the thickness of the lower ribs 64 that are arranged in the ischium corresponding region 60c is greater than the thickness of the lower ribs 64 that are arranged in a region other than the ischium corresponding region 60c.

With the configuration as described above, in the ischium corresponding region 60c in which a load applied by a seat occupant is relatively large in the bottom plate 60, the thickness of the reinforcement ribs 61 can be secured, and the rigidity of the seat S can be secured. Further, the seating region 60b in which a load applied by a seat occupant is relatively large in the bottom plate 60 is provided with the honeycomb shape having regular triangular partitions, whereby the rigidity can be further improved.

Other Embodiments

In the embodiments as described above, the seat S has been described with respect to a seat for motorcycles that are exposed directly to solar radiation and exposed directly to wind, rain, or snow as a specific example, which is, however, not limitative, and may be utilized as a seat for saddled vehicles used outdoors, such as snowmobiles or personal watercrafts on the water. Moreover, utilization of the seat S is possible as a saddled vehicle seat on which a seat occupant sits astraddle, a seat for cars, such as automobiles, electric cars, and buses, as well as a seat for other vehicles, such as aircrafts and ships.

In the embodiments as described above, the seat S is configured as a single seat for one person, which is, however, not limitative, and may be configured as a double seat for two people that includes a front seat and a back seat. In such a case, the honeycomb-shaped reinforcement ribs as described above can be similarly applied in a seating region in which the second person is seated.

In the present disclosure, the vehicle seats according to various embodiments have been described. However, the foregoing embodiments are only examples for facilitating the understanding of the invention and by no means limit the invention. The embodiments may be modified and improved without departing from the spirit thereof, and the invention includes equivalents thereof as a matter of course. In particular, the shape, arrangement and configuration of the reinforcement ribs arranged on the surface of the bottom plate that have been described in the foregoing embodiments are only examples and by no means limit the invention.

TABLE OF REFERENCE NUMERALS

S: seat
10: cushion material
20: skin material
30, 40, 50, 60: bottom plate
   30a: hinge mounting region
   30b, 40b, 50b, 60b: seating region
   30c, 60c: ischium corresponding region
   30d, 40d: lock bar mounting region
   30e, 40e, 50e: fuel supply opening corresponding region
31, 41, 51, 61: reinforcement rib
32, 42, 52, 62: upper rib
33, 43, 53, 63: side rib
34, 54, 64: lower rib -continued

TABLE OF REFERENCE NUMERALS

35: reinforcement protrusion portion
   35a: center protrusion portion
   35b: annular protrusion portion
   35c: relief protrusion portion
   35a1, 35b1: second concave portion
36: reinforcement depression portion
37, 57: center through hole
38, 58: air release hole
39: recessed region
   39a: first concave portion

The invention claimed is:

1. A vehicle seat comprising:
a seating portion that includes a bottom plate,
wherein the bottom plate comprises:
   reinforcement ribs that project from a surface of the bottom plate; and
   a reinforcement protrusion portion that projects from a bottom surface side of the bottom plate toward a top surface side of the bottom plate;
wherein:
   the reinforcement ribs comprise upper ribs arranged on a top surface of the bottom plate and lower ribs arranged on a bottom surface of the bottom plate;
   at least some of the upper ribs and at least some of the lower ribs form a honeycomb shape; and
   the lower ribs are arranged in a recessed portion on a bottom surface of the reinforcement protrusion portion.

2. The vehicle seat according to claim 1, wherein at least some of the reinforcement ribs are arranged in a seating region that is configured to support a seat occupant.

3. The vehicle seat according to claim 2, wherein at least some of the reinforcement ribs are arranged in an ischium corresponding region that is configured to support right and left ischium parts of the seat occupant in the seating region.

4. The vehicle seat according to claim 3, wherein at least a part of the reinforcement ribs that is arranged in the ischium corresponding region has a thickness greater than that of at least a second part of the reinforcement ribs that is arranged in a region other than the ischium corresponding region.

5. The vehicle seat according to claim 2, wherein the upper ribs and the lower ribs extend radially from a center portion of the seating region toward an outer edge side of the seating region.

6. The vehicle seat according to claim 2,
wherein the reinforcement protrusion portion comprises a center protrusion portion provided at a center portion of the seating region and an annular protrusion portion arranged outside the center protrusion portion to form a space therebetween and connected to the center protrusion portion through the upper ribs, and
the upper ribs and the lower ribs are arranged alternately, while extending radially from the center protrusion portion toward a side of the annular protrusion portion.

7. The vehicle seat according to claim 6, wherein top surfaces of the center protrusion portion, the upper ribs, and the annular protrusion portion form a plane in the seating region.

8. The vehicle seat according to claim 6,
wherein the center protrusion portion and the annular protrusion portion comprise a substantially annular cross section, and the reinforcement protrusion portion comprises a plurality of substantially annular cross sections to form a predetermined space therebetween from the center portion of the seating region toward an outer edge side.

9. The vehicle seat according to claim 6,
wherein a center through hole that extends from the top surface side of the bottom plate to the bottom surface side of the bottom plate is provided at a center portion of the center protrusion portion,
an air release hole that is provided on the top and bottom surfaces of the bottom plate at a part of the seating region different from the center through hole and extends from the top surface side of the bottom plate to the bottom surface side of the bottom plate, and
the upper ribs and the lower ribs extend radially from the center through hole to the air release hole.

10. The vehicle seat according to claim 2, wherein the reinforcement ribs comprise side ribs that linearly extend from a side of the seating region toward an outer edge side on an outer surface of the bottom plate.

11. The vehicle seat according to claim 1,
wherein
the upper ribs are provided at a region adjacent to the reinforcement protrusion portion.

12. The vehicle seat according to claim 1, wherein at least one of the upper ribs and the lower ribs is arranged to partition at least a part of each of substantially hexagonal shapes of the honeycomb shape into two or more substantially polygonal shapes in the seating region.

13. The vehicle seat according to claim 1,
wherein a part of the reinforcement ribs is arranged on a top surface of the bottom plate in a fuel supply opening corresponding region that corresponds to a fuel supply opening of a vehicle, and forms the honeycomb shape in the fuel supply opening corresponding region.

14. A vehicle seat comprising:
a seating portion that includes a bottom plate;
wherein the bottom plate comprises:
reinforcement ribs that project from a surface of the bottom plate;
a reinforcement protrusion portion that projects from a bottom surface side of the bottom plate toward a top surface side of the bottom plate; and
a recessed region that is arranged adjacent to the reinforcement protrusion portion and is recessed from the top surface side of the bottom plate toward the bottom surface side of the bottom plate;
wherein:
the reinforcement ribs comprise upper ribs arranged on a top surface of the bottom plate and lower ribs arranged on a bottom surface of the bottom plate,
the recessed region comprises a plurality of first concave portions, each of the plurality of first concave portions having a substantially hexagonal shape partitioned by the upper libs, and the plurality of first concave portions forming a honeycomb shape, and
the reinforcement protrusion portion comprises a plurality of second concave portions that are recessed from the bottom surface side of the bottom plate toward the top surface side of the bottom plate, each of the plurality of second concave portions having a substantially hexagonal shape partitioned by the lower libs, and the plurality of second concave portions forming a honeycomb shape.

15. The vehicle seat according to claim 14, wherein each of the reinforcement protrusion portion and the recessed region has an annular shape and is arranged concentrically with each other.

16. The vehicle seat according to claim 15,
wherein the reinforcement protrusion portion comprises a center protrusion portion provided at a center portion of a seating region that is configured to support a seat occupant and an annular protrusion portion arranged outside the center protrusion portion to form a space therebetween and connected to the center protrusion portion through the upper ribs, and
the upper ribs and the lower ribs are arranged alternately, while extending radially from the center protrusion portion toward a side of the annular protrusion portion.

17. The vehicle seat according to claim 16,
wherein a center through hole that extends from the top surface side of the bottom plate to the bottom surface side of the bottom plate is provided at a center portion of the center protrusion portion,
an air release hole that is provided on the top and bottom surfaces of the bottom plate at a part of the seating region different from the center through hole and extends from the top surface side of the bottom plate to the bottom surface side of the bottom plate, and
the upper ribs and the lower ribs extend radially from the center through hole to the air release hole.

18. The vehicle seat according to claim 14, wherein the reinforcement ribs comprise side ribs that linearly extend from a side of a seating region that is configured to support a seat occupant toward an outer edge side on an outer surface of the bottom plate.

19. The vehicle seat according to claim 14,
wherein a part of the reinforcement ribs is arranged on a top surface of the bottom plate in a fuel supply opening corresponding region that corresponds to a fuel supply opening of a vehicle, and forms the honeycomb shape in the fuel supply opening corresponding region.

* * * * *